United States Patent [19]

Keller

[11] Patent Number: 5,074,165
[45] Date of Patent: Dec. 24, 1991

[54] COVER FOR INSULATING STEERING WHEELS FROM AMBIENT AIR

[76] Inventor: Theodore F. Keller, 2416 Yorktown #379, Houston, Tex. 77056

[21] Appl. No.: 658,907

[22] Filed: Feb. 22, 1991

[51] Int. Cl.5 .............................................. G05G 1/04
[52] U.S. Cl. ..................................... 74/558.5; 74/558
[58] Field of Search ................... 74/558, 558.5; 5/443, 5/431, 434, 436, 490

[56] References Cited

U.S. PATENT DOCUMENTS

| | | | |
|---|---|---|---|
| 1,202,734 | 10/1916 | Kirby | 74/558.5 |
| 1,251,313 | 12/1917 | White | 74/558.5 |
| 1,351,303 | 8/1920 | Scott | 74/558.5 |
| 4,102,377 | 7/1978 | Ostrem | 74/558.5 |
| 4,262,385 | 4/1981 | Norman | 74/558.5 |
| 4,605,124 | 8/1986 | Sandel et al. | 74/558.5 X |
| 4,685,499 | 8/1987 | Black | 74/558 X |
| 4,688,286 | 8/1987 | Miker | 5/434 X |
| 4,928,711 | 5/1990 | Williams | 5/434 X |
| 4,991,245 | 2/1991 | Franco | 5/490 |
| 4,993,281 | 2/1991 | Miller | 74/558.5 |

FOREIGN PATENT DOCUMENTS

| | | | |
|---|---|---|---|
| 2622427 | 11/1977 | Fed. Rep. of Germany | 74/558 |
| 0202568 | 8/1989 | Japan | 74/558 |
| 691836 | 5/1953 | United Kingdom | 74/558 |

*Primary Examiner*—Vinh T. Luong
*Attorney, Agent, or Firm*—Michael P. Breston

[57] ABSTRACT

The novel cover is designed to insulate the steering wheel mounted on the hub portion of a steering wheel column of a parked vehicle. The cover has a front panel and a rear panel forming a pocket therebetween. The pocket has a closed end and an open end. The rear panel has a center hole sized to substantially capture the hub portion of the steering wheel column. A slit extends downwardly from the center hole. The opposite edges of the slit spread apart to allow the steering wheel to easily slide into and out of the pocket. The cover is made and sized to substantially thermally insulate the entire steering wheel from the hot or cold ambient air in the parked vehicle.

2 Claims, 2 Drawing Sheets

COVER FOR INSULATING STEERING WHEELS FROM AMBIENT AIR

BACKGROUND OF THE INVENTION

1. Field of the Invention

This invention relates generally to covers for insulating steering wheels and, more particularly, to covers for insulating steering wheels from hot or cold ambient air within parked vehicles.

2. Description of the Prior Art

In very hot dry summer or in very cold winter weather the air within cars or trucks parked outside can cause their steering wheels to reach temperatures which are very uncomfortable to the touch. Various types of steering wheel covers have been proposed to remedy this problem and some of them are described in the following U.S. Pat. Nos.

4,685,499
4,458,738
4,102,377
2,601,881
1,997,738
1,987,599
1,927,913

The prior art covers known to me are intended primarily to inhibit the passage of solar radiation therethrough to the steering wheels, but not to insulate them from the hot or cold ambient air within the parked vehicles.

For example, U.S. Pat. No. 4,102,377 shows a steering wheel cover 10 forming an arcuate pocket 12 that is lined with an insulating foam 20 (Col. 2, lines 51-65).

The arcuate pocket 12 defines a cavity 18 which receives the upper half, while a frontal skirt 14 overlays the lower half of the steering wheel S, which is exposed continuously to the hot or cold ambient air within the parked vehicle. Therefore, the temperature of the steering wheel rises and falls with the ambient air temperature.

U.S. Pat. No. 4,685,499 shows a steering wheel cover 10 having a pair of parallel, spaced-apart sheet members 21, 22 whose cut out corners 21E, 21F and 22E, 22F respectively define top vent apertures 36 and 38 which allow the ambient air in the parked vehicle to circulate therethrough (Col. 5, lines 8-13). Therefore, the temperature of the steering wheel also fluctuates with the ambient air temperature within the vehicle.

Accordingly, it is a main object of the present invention to provide steering wheel covers which, in a scorcher summer day, or in an ice-cold winter day, can effectively insulate steering wheels from ambient hot or cold air within parked motor vehicles.

SUMMARY OF THE INVENTION

The novel sterring wheel cover has a front panel and a rear panel forming a pocket therebetween. The pocket has a closed end and an open end of sufficient size to allow the steering wheel to easily slide into and out of the pocket and to be substantially fully covered thereby. The rear panel has a center hole sized to accommodate and capture the hub portion of the steering wheel column. A long narrow slit in the rear panel extends downwardly from the center hole and splits the lower half of the rear panel into two equal quarter panels.

The cover is donned on the steering wheel by sliding it into the pocket until the hub portion of the steering wheel column slides through the narrow slit into the center hole of the rear panel at which time the entire steering wheel is fully captured inside the pocket.

Preferably, the front and rear panels have a thermal insulator thereon. The pocket and its center hole are sized to substantially thermally insulate the exposed surfaces of the entire steering wheel from the ambient air within the parked vehicle. Preferably, fastener means are provided on the open end of the pocket to prevent ambient hot or cold air from entering into or circulating through the pocket. The fastener means are preferably VELCRO fasteners. The VELCRO fasteners use woven hooks and loops which become mechanically engaged and disengaged.

DETAILED DESCRIPTION OF A PREFERRED EMBODIMENT

Figure 1:
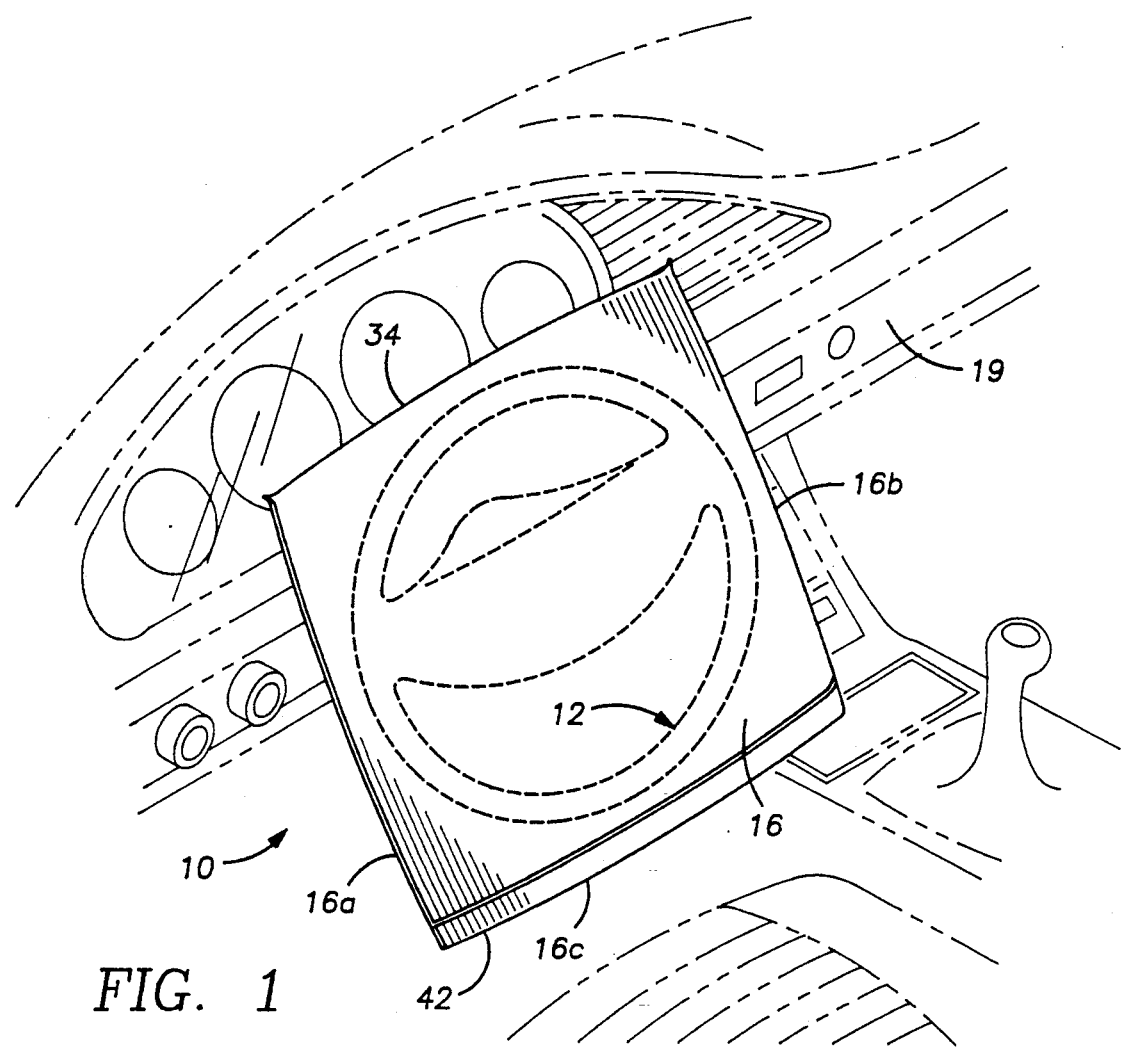
FIG. 1 is a front perspective view of the novel steering wheel cover device shown mounted on a steering wheel.

Throughout the drawings, the same reference characters designate the same or similar parts.

Figure 2:
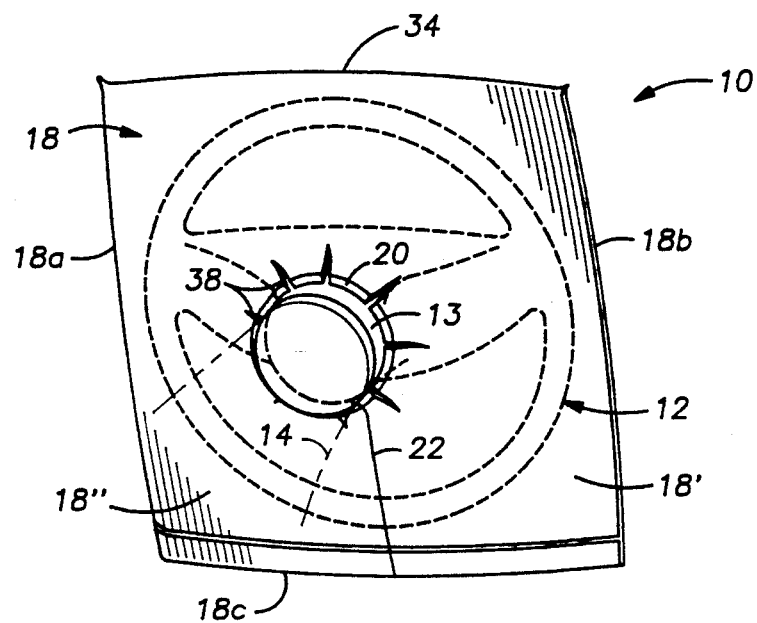
FIG. 2 is a rear perspective view of the steering wheel cover device shown in FIG. 1.
Figure 3:
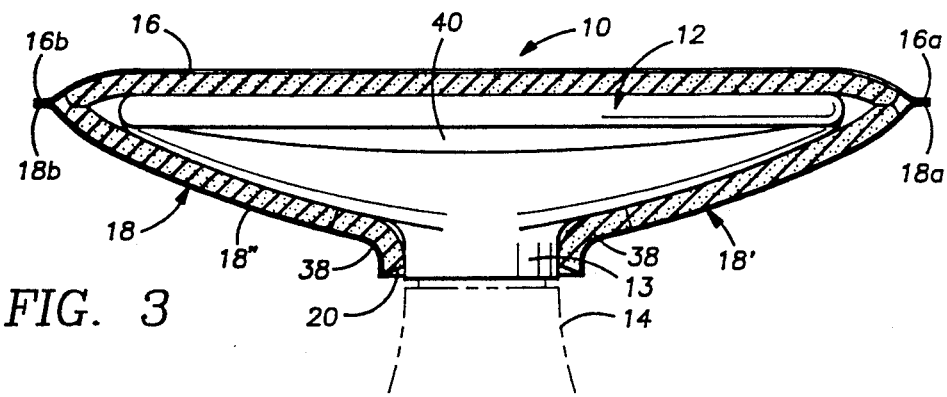
FIG. 3 is a lateral sectional view of the cover shown in FIG. 1 taken through the center thereof.

FIGS. 1-3 show the novel cover, generally designated as 10, for protecting the steering wheel 12 mounted on the hub 13 of a steering wheel column 14 of a parked motor vehicle.

When assembled, cover 10 comprises a front panel 16 facing the driver and a rear panel 18 facing the dashboard 19. Front panel 16 has sides 16a, 16b and a bottom edge 16c folded on itself. Rear panel 18 has sides 18a, 18b and a bottom edge 18c also folded on itself. Rear panel 18 has a center hole 20, typically of circular shape, which is sized to accommodate and snugly capture the hub portion 13 of steering wheel column 14. A very narrow straight slit 22 extends from hole 20 down to bottom edge 18c, thereby dividing the lower half of panel 18 into two equal quarter panels 18' and 18".

Figure 5:
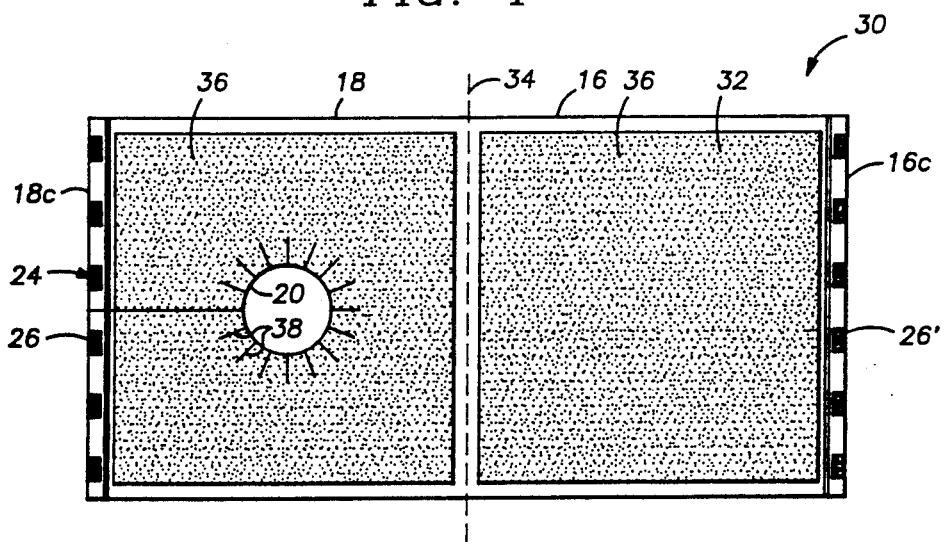
FIG. 5 is a planar view of the cover in an unfolded condition illustrating the process of making it.

Fastener means 24 (FIG. 5) are provided between the opposite bottom edges 16c and 18c. The preferred fasteners are mating VELCRO (TM of Velcro USA, Inc.) strips 26, 26'. The VELCRO strips 26, 26' use woven hooks and loops which become mechanically interengaged and disengaged.

Cover 10 is preferably made from an opaque, lightweight, sufficiently flexible and deformable material which will easily match the shape of hub portion 13 and of its steering wheel 12. Suitable such materials include leather, vinyl, polyethylene, cloth, paper or combinations thereof, all adapted to inhibit the transfer of solar radiation therethrough onto steering wheel 12. The selected material or materials should be easily trimmable with knife or scissors.

The process for making cover 10 involves cutting out a rectangle 30 (FIG. 5) from the selected material. The rectangle has an inner surface 32. The center dividing line 34 partitions rectangle 30 into two equal halves 16 and 18 on the opposite sides of line 34, which will become the top edge of cover 10 (FIG. 5) in the folded condition.

A circular disc is cutout from the center of panel 18 thereby leaving center hole 20. Straight long slit 22 is then cut starting from the edge of hole 20 down to bottom edge 18c.

To accommodate different sizes of hubs 13, it is also preferred to cut at least two but preferably a plurality of short radial slits 38 extending outwardly and radially from the center of hole 20. Radial slits 38 allow the diameter of hole 20 to gradually enlarge, thereby accommodating hubs 13 of steering wheel columns 14 whose diameters are larger than the diameter of hole 20. Thus, radial slits 38 allow for adjustability to accommodate a range of steering wheels. Pairs of opposite strips 26', 26 (FIG. 5) can be bonded to the bottom edges 16c, 18c, respectively, by a suitable adhesive or they can be sewn thereto.

Preferably, a layer of insulating material 36, which may be an open cell foam, is provided over substantially the entire inner surfaces of panels 16 and 18, as shown. A short rectangular strip on either side of dividing line 34 is left bare. This insulating foam 36 can be sprayed on or bonded to panels 16 and 18.

Figure 4:
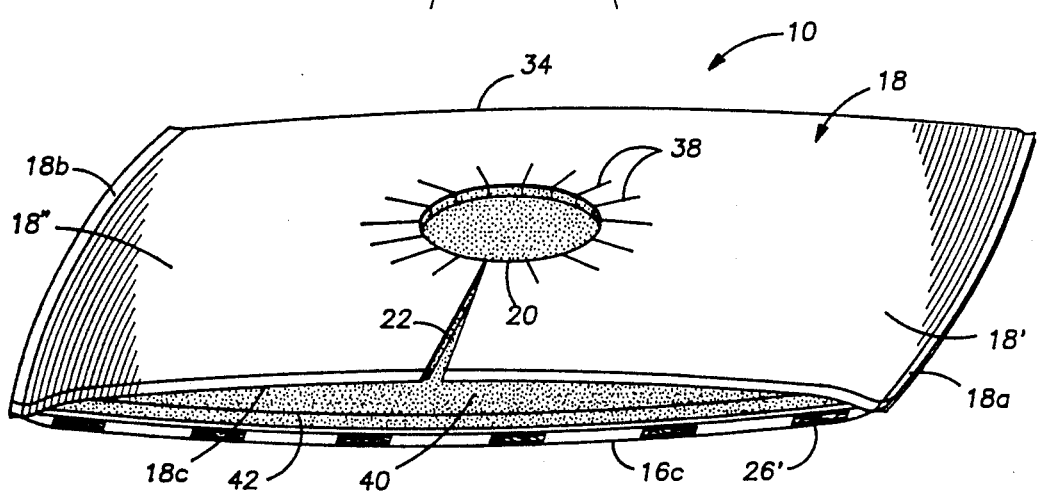
FIG. 4 is a view substantially similar to FIG. 2 but without the steering wheel.

Rectangle 30 is then folded over dividing line 34 and the opposite sides 16a, 16b and 18a, 18b (FIG. 3) are respectively bonded to each other, whereby panels 16 and 18 form a pocket 40 therebetween having a closed top end 34 (FIG. 4) and an open bottom end or mouth 42 which contains pairs of opposite mating strips 26, 26'.

Strips 26 carries woven hooks and strip 26' carries woven loops to allow for detachable mechanical interaction to take place between hooks and loops. Strips 26, 26' are durable, resistant to weather and water, and can be attached and detached many thousands of times. All that is necessary to separate the strips is to peel one from the other. They can become detachably fastened to each other in whatever position they are pressed together, thereby providing an adjustable self-locking action to opposite bottom edges 16c and 18c. Fastener means 24 are sufficiently strong to resist shear and tensile forces, and yet remain flexible and easily deformable.

In use, pocket 40 (FIG. 3) is of sufficient length and width to completely envelop steering wheel 12 and to allow it to easily slide into and out of the pocket by spreading apart the opposite edges of slit 22 (FIGS. 2-4), while the hub portion 13 of steering wheel column 14 becomes nested within center hole 20.

Thereafter, the opposite edges of slit 22 return to their normally abutting position (FIG. 2), and mouth 42 (FIG. 4) of pocket 40 is closed by pressing slightly on strips 26, 26'.

The panels 16, 18, center hole 20, and slit 22 are sized to substantially fully thermally insulate the exposed surfaces of hub portion 13 and of its steering wheel 12, and to minimize ambient hot or cold air from circulating around the steering wheel. Cover 10 also inhibits sun rays from reaching steering wheel 12.

Cover 10 and insulator 36 easily match the shape of the hub portion 13 of steering wheel column 14, thereby minimizing leakage of ambient air into pocket 40 (FIG. 3) through the edge of hole 20 and the abutting edges of slit 22 (FIG. 2).

Strips 26, 26' additionally provide an effective barrier to ambient air penetration into pocket 40.

By minimizing transfer of thermal and radiation energy through cover 10 from the inner space of the parked vehicle into the space confined within pocket 40, it is possible to maintain in the summer and winter the temperature of steering wheel 12 at a comfortable level for the hands of the driver.

Thus, steering wheel 12 will remain cool in the summer and warm in the winter, especially due to the thermal insulating effect of foam 36 and to the solar ray reflecting ability of the opaque material of cover 10.

It will be appreciated that steering wheel cover 10 is safe, trouble-free, and provides a completely new and unique approach to steering wheel cover design. It successfully accomplishes its objectives by virtue of its simplicity, flexibility, and versatility.

What I claim is:

1. A cover for insulating the steering wheel mounted on the hub of a steering wheel column of a parked vehicle, said cover comprising:
   a front panel having a bottom edge;
   a rear panel having an opposite bottom edge;
   said front and rear panels forming therebetween a pocket having a closed top end and an open bottom end between said bottom edges of said front and rear panels;
   mating fastener means on said bottom edges for opening and closing said pocket, thereby substantially impeding hot or cold ambient air penetration into said pocket from the interior of said parked vehicle;
   said rear panel having
   a) a center hole sized to substantially capture said hub portion of said steering wheel column, and
   b) a long slit extending downwardly from said center hole to its bottom edge and said slit defining opposite edges which, in use, spread apart to allow said steering wheel to slide into and out of said pocket and to become substantially fully captured therein, thereby substantially insulating the whole steering wheel from the hot or cold ambient air within said parked vehicle, and
   a plurality of radial slits extending from the edge of said center hole in said rear panel to allow the diameter of said center hole to enlarge for accommodating steering wheel columns of larger diameter than the diameter of said center hole.

2. A cover for insulating the steering wheel mounted on the hub of a steering wheel column of a parked vehicle, said cover comprising:
   a front panel having a bottom edge;
   a rear panel having a bottom edge;
   said front and rear panels forming therebetween a pocket having a closed top end and said bottom edges defining therebetween an oval opening of sufficient size to allow the entire steering wheel to slide into and out of said pocket;
   mating fastener means on said outer bottom edges for opening and closing said pocket, thereby substantially impeding hot or cold ambient air penetration into said pocket from the interior of said parked vehicle;
   said rear panel having
   a) a center hole sized to substantially capture said hub portion of said steering wheel column, and
   b) a long slit extending downwardly from said center hole to its bottom edge and defining slit edges which, in use, spread apart to allow said steering wheel to slide into and out of said pocket and to become substantially fully captured therein, thereby substantially insulating the whole steering wheel from the hot or cold ambient air within said parked vehicle; and
   at least two radial slits extending from the edge of said center hole in said rear panel to allow the diameter of said center hole to enlarge for accommodating steering wheel columns of larger diameter than the diameter of said center hole.

* * * * *